(12) United States Patent
Wong et al.

(10) Patent No.: US 11,692,484 B2
(45) Date of Patent: Jul. 4, 2023

(54) TURBOFAN ENGINE WITH HEAT EXCHANGER MODULE HAVING OPTIMIZED FAN TO ELEMENT AREA PARAMETER

(71) Applicant: ROLLS-ROYCE plc, London (GB)

(72) Inventors: Natalie C Wong, Bristol (GB); Thomas S Binnington, Bristol (GB); David A Jones, Bristol (GB); Daniel Blacker, Bristol (GB)

(73) Assignee: ROLLS-ROYCE plc, London (GB)

( * ) Notice: Subject to any disclaimer, the term of this patent is extended or adjusted under 35 U.S.C. 154(b) by 4 days.

(21) Appl. No.: 17/484,771

(22) Filed: Sep. 24, 2021

(65) Prior Publication Data

US 2022/0112838 A1  Apr. 14, 2022

(30) Foreign Application Priority Data

Oct. 9, 2020  (GB) ...................... 2016004

(51) Int. Cl.
*F02C 7/08* (2006.01)
*F02K 3/00* (2006.01)
(Continued)

(52) U.S. Cl.
CPC ............... *F02C 7/08* (2013.01); *F02C 7/04* (2013.01); *F02K 3/00* (2013.01); *F02K 3/06* (2013.01);
(Continued)

(58) Field of Classification Search
CPC ...... F02C 7/04; F02C 7/08; F02C 7/10; F02C 7/14; F02C 7/141; F02C 7/18;
(Continued)

(56) References Cited

U.S. PATENT DOCUMENTS

| 2,474,258 A | 6/1949 | Kroon | |
| 5,274,999 A * | 1/1994 | Rohra | ..................... F02C 3/067 |
| | | | 60/268 |

(Continued)

FOREIGN PATENT DOCUMENTS

| EP | 3 165 451 A1 | 5/2017 |
| GB | 1 358 076 A | 6/1974 |

(Continued)

OTHER PUBLICATIONS

Apr. 8, 2021 Search Report issued in British Patent Application No. 2016004.0.

(Continued)

*Primary Examiner* — Alain Chau
(74) *Attorney, Agent, or Firm* — Oliff PLC

(57) ABSTRACT

A turbofan gas turbine engine includes, in axial flow sequence, a heat exchanger module, a fan assembly, a compressor module, and a turbine module. The fan assembly includes fan blades defining a corresponding fan area ($A_{FAN}$). The heat exchanger module is in fluid communication with the fan assembly by an inlet duct, and includes radially-extending vanes arranged in a circumferential array with at least one vane including a heat transfer element for heat transfer from a first fluid contained within each element to an airflow passing over a surface of each heat transfer element before entering the fan assembly inlet. Each heat transfer element extends axially along the corresponding vane, with a swept heat transfer element area ($A_{HTE}$) being the wetted surface area of all heat transfer elements in contact with the airflow. A Fan to Element Area parameter $F_{EA}$ of $A_{HTE}/A_{FAN}$ lies in the range of 47 to 132.

14 Claims, 5 Drawing Sheets

(51) Int. Cl.
*F02C 7/04* (2006.01)
*F02K 3/06* (2006.01)

(52) U.S. Cl.
CPC .. *F05D 2220/323* (2013.01); *F05D 2260/213* (2013.01); *F05D 2260/2214* (2013.01)

(58) Field of Classification Search
CPC ... F02C 7/185; F02K 3/00; F02K 3/04; F02K 3/06; F02K 3/072; F02K 3/08; F02K 3/105; F02K 3/115
See application file for complete search history.

(56) References Cited

U.S. PATENT DOCUMENTS

| | | | | |
|---|---|---|---|---|
| 5,794,432 | A * | 8/1998 | Dunbar | F02K 1/16 60/226.1 |
| 6,004,095 | A * | 12/1999 | Waitz | F04D 29/667 415/115 |
| 7,811,050 | B2 * | 10/2010 | Roth | F02K 3/06 415/118 |
| 8,282,337 | B2 * | 10/2012 | Wadia | F04D 29/687 415/914 |
| 9,702,630 | B2 * | 7/2017 | Whaites | F28D 7/0008 |
| 2012/0087787 | A1 * | 4/2012 | Brown | F02K 3/06 415/208.1 |
| 2016/0201989 | A1 | 7/2016 | Martinez et al. | |
| 2016/0265850 | A1 * | 9/2016 | Kupiszewski | F28D 7/163 |
| 2017/0003080 | A1 * | 1/2017 | Whaites | F01D 9/02 |
| 2017/0122207 | A1 * | 5/2017 | Suciu | B64C 11/14 |
| 2018/0080476 | A1 * | 3/2018 | McCune | F04D 29/522 |
| 2018/0171871 | A1 * | 6/2018 | Duong | F28D 7/163 |
| 2019/0078452 | A1 * | 3/2019 | Zaccardi | F04D 29/687 415/914 |
| 2019/0153978 | A1 * | 5/2019 | Dievart | F02K 3/06 415/118 |
| 2019/0186293 | A1 | 6/2019 | Boutaleb et al. | |
| 2020/0173365 | A1 * | 6/2020 | Roberge | F02C 3/067 60/268 |

FOREIGN PATENT DOCUMENTS

| | | | |
|---|---|---|---|
| GB | 2 525 971 A | | 11/2015 |
| WO | WO-02101313 A1 * | 12/2002 | ........... F28D 9/0012 |

OTHER PUBLICATIONS

Feb. 11, 2022 extended Search Report issued in European Patent Application No. 21198480.2.
Li, Q. et al., "Compact heat exchangers: A review and future applications for a new generation of high temperature solar receivers," Renewable and Sustainable Energy Reviews, vol. 15, pp. 4855-4875, 2011.

* cited by examiner

TURBOFAN ENGINE WITH HEAT EXCHANGER MODULE HAVING OPTIMIZED FAN TO ELEMENT AREA PARAMETER

This disclosure claims the benefit of UK Patent Application No. GB 2016004.0, filed on 9 Oct. 2020, which is hereby incorporated herein in its entirety.

FIELD OF THE DISCLOSURE

The present disclosure relates to a turbofan gas turbine engine and particularly to a turbofan gas turbine engine having an inlet mounted heat exchanger.

BACKGROUND TO THE DISCLOSURE

A conventional turbofan gas turbine engine uses heat exchangers to cool a variety of fluids including inter alia air, fuel and oil. Typically, such heat exchangers use bypass air or an air offtake from the compressor as the cooling medium. The heat exchanger itself may be positioned in the bypass duct or externally to the engine with the corresponding ducting.

The use of bypass air or a compressor offtake stream as the cooling medium in a heat exchanger will adversely affect the performance of the engine, for example by reducing specific thrust or increasing specific fuel consumption. Alternatively, or additionally, such offtakes can adversely affect engine performance, for example by reducing surge margin.

In a further alternative conventional arrangement, an airflow to provide the cooling medium in a heat exchanger may be drawn separately from the airflow through the gas turbine engine. For example, in an airframe application the airflow providing the cooling medium may be drawn from an air intake or duct separate from the engine.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

Statements of Disclosure

According to a first aspect of the present disclosure, there is provided a turbofan gas turbine engine comprising, in axial flow sequence, a heat exchanger module, a fan assembly, a compressor module, and a turbine module, the fan assembly comprising a plurality of fan blades defining a corresponding fan assembly flow area ($A_{FAN}$), the heat exchanger module being in fluid communication with the fan assembly by an inlet duct, the heat exchanger module comprising a plurality of radially-extending vanes arranged in a circumferential array, at least one of the vanes comprising at least one heat transfer element for the transfer of heat energy from a first fluid contained within the or each heat transfer element to an airflow passing over a surface of the or each heat transfer element prior to entry of the airflow into an inlet to the fan assembly; wherein the or each heat transfer element extends axially along the corresponding vane, a swept heat transfer element area ($A_{HTE}$) being the wetted surface area of the or all heat transfer elements in contact with the airflow, a Fan to Heat Transfer Element Area parameter $F_{EA}$ being defined as:

$$F_{EA} = \frac{A_{HTE}}{A_{FAN}}$$

and the $F_{EA}$ parameter lies in the range of 47 to 132.

As previously described, the flow area is to be understood to mean a cross-sectional area of the air flow taken perpendicularly to a central axis of the flow in the flow direction. In other words, for the fan assembly the flow area $A_{FAN}$ corresponds to the cross-sectional area of the fan assembly through which the flow passes.

The total wetted area (swept heat transfer element area, $A_{HTE}$) of the heat transfer elements provides a measure of the quantity of heat energy that it may be possible to reject via the heat exchanger module to the through-flowing air flow. The term wetted area is understood to mean the area of the heat transfer elements that is contacted (or swept) by the fluid constituting the air flow as it passes through the heat exchanger module.

Since the flow area of the fan assembly scales with engine thrust (larger fan assembly flow area=greater engine thrust), the ratio of swept heat transfer element area to fan assembly flow area provides an indicative measure of the efficiency of the turbofan engine at rejecting heat for a given thrust output.

In one arrangement, a turbofan engine has a heat exchanger module having a swept heat transfer element area ($A_{HTE}$) of 70 m² with a fan area ($A_{FAN}$) of 0.53 m². In this configuration the corresponding $F_{EA}$ parameter is approximately 132. Alternatively, the swept heat transfer element area ($A_{HTE}$) may be approximately 25 m² with a fan area ($A_{FAN}$) of 0.53 m² resulting in a $F_{EA}$ parameter of approximately 47.

Optionally, the $F_{EA}$ parameter lies in the range of 57 to 97.

In one arrangement of the present disclosure, the heat transfer element may have a construction in which only a primary surface area of the heat transfer element is swept by the fluid making up the air flow as it passes through the heat exchanger module. One example of a heat transfer element construction having only a primary surface area might be a tube heat exchanger.

In another arrangement, a turbofan engine has a heat exchanger module having a swept heat transfer element area ($A_{HTE}$) of 50 m² with a fan area ($A_{FAN}$) of 0.53 m². In this configuration the corresponding $F_{EA}$ parameter is approximately 94. Alternatively, the swept heat transfer element area ($A_{HTE}$) may be approximately 30 m² with a fan area ($A_{FAN}$) of 0.53 m² resulting in a $F_{EA}$ parameter of approximately 57.

Optionally, the $F_{EA}$ parameter lies in the range of 76 to 123.

In an arrangement of the present disclosure, the heat transfer element may have a construction in which the heat transfer element has both a primary surface area and a secondary surface area, both of which are swept by the fluid making up the air flow as it passes through the heat exchanger module. One example of a heat transfer element construction having both primary and secondary surface areas might be a tube and fin heat exchanger.

In another arrangement, a turbofan engine has a heat exchanger module having a swept heat transfer element area ($A_{HTE}$) of 65 m² with a fan area ($A_{FAN}$) of 0.53 m². In this configuration the corresponding $F_{EA}$ parameter is approximately 123. Alternatively, the swept heat transfer element area ($A_{HTE}$) may be approximately 40 m² with a fan area ($A_{FAN}$) of 0.53 m² resulting in a $F_{EA}$ parameter of approximately 76.

Optionally, the fan diameter D is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip radius, measured between a centreline of the engine and an outermost tip of each fan blade at its leading edge, may be in the range from 95 cm to 200 cm, for example in the range from 110 cm to 150 cm, or alternatively in the range from 155 cm to 200 cm. The fan tip radius may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be greater than 160 cm.

The fan tip radius may be in the range from 95 cm to 150 cm, optionally in the range from 110 cm to 150 cm, optionally in the range of from 110 cm to 145 cm, and further optionally in the range from 120 cm to 140 cm.

The fan tip radius may be in the range from 155 cm to 200 cm, optionally in the range from 160 cm to 200 cm, and further optionally in the range from 165 cm to 190 cm.

Optionally, the heat exchanger module has a flow area $A_{HEX}$ and the fan assembly has a flow area $A_{FAN}$, and a ratio of $A_{HEX}/A_{FAN}$ being in the range of 0.3 to 0.8.

The flow area is to be understood to mean a cross-sectional area of the air flow taken perpendicularly to a central axis of the flow in the flow direction. In other words, for the heat exchanger module the flow area $A_{HEX}$ corresponds to the cross-sectional area of the heat exchanger module through which the flow passes. Likewise, for the fan assembly the flow area $A_{FAN}$ corresponds to the cross-sectional area of the fan assembly through which the flow passes.

In one arrangement of the present disclosure, the flow area of the heat exchanger module has an annular profile and extends over only a radially outward circumferential portion of the flow area of the fan assembly. In other words, the air flow entering a radially proximal portion of the flow area of the fan assembly does not pass through the heat exchanger assembly and simply enters the fan assembly. In one arrangement, the radially outward circumferential portion of the flow area of the fan assembly amounts to 60% of the flow area of the fan assembly.

In another arrangement, the flow area of the heat exchanger module extends completely over the flow area of the fan assembly.

Optionally, the heat exchanger module has a fluid path diameter E, wherein the fluid path diameter E is greater than the fan diameter D.

In one embodiment, the heat exchanger module has a fluid path diameter E that is greater than the fan diameter D. In this embodiment, the inlet duct that connects the heat exchanger module to the fan assembly has a diameter than converges from an exit from the heat exchanger module to an entrance to the fan assembly.

Optionally, the turbofan gas turbine engine further comprises an outer housing, the outer housing enclosing the sequential arrangement of heat exchanger module, fan assembly, compressor module, and turbine module, an annular bypass duct being defined between the outer housing and the sequential arrangement of modules, a bypass ratio being defined as a ratio of a mass air flow rate through the bypass duct to a mass air flow rate through the sequential arrangement of modules, and wherein the bypass ratio is less than 2.0.

A turbofan engine having a bypass ratio (BPR) of less than approximately 2.0 will have a generally smaller bypass duct (the annular duct surrounding the core gas turbine engine) than a turbofan engine having a BPR greater than approximately 2.0. For a turbofan engine with a BPR greater than, say, 2.0, the correspondingly larger bypass duct volume provides more scope for positioning a heat exchanger within the bypass duct than would be the case for a low BPR turbofan engine.

Optionally, the fan assembly has two or more fan stages, at least one of the fan stages comprising a plurality of fan blades defining the fan diameter D.

In one arrangement, the fan assembly has two fan stages with both fan stages comprising a plurality of fan blades defining the same fan diameter. Alternatively, each of the fan stages may have different fan diameters.

According to another aspect of the present disclosure there is provided a method of operating an aircraft comprising the gas turbine engine according to the first aspect, the method comprising taking off from a runway, wherein the maximum rotational speed of the turbine during take-off is in the range of from 8500 rpm to 12500 rpm.

The maximum take-off rotational fan speed may be in a range between 8500 rpm to 12500 rpm. Optionally, for example for an engine with a fan tip radius in the range from 25 cm to 40 cm, the maximum take-off rotational fan speed may be in a range between 9000 rpm to 11000 rpm. Optionally, for example for an engine with a fan tip radius in the range from 35 cm to 50 cm, the maximum take-off rotational fan speed may be in a range between 8500 rpm to 10500 rpm.

According to another aspect of the present disclosure, there is provided a method of operating a turbofan gas turbine engine, the gas turbine engine comprising, in axial flow sequence, a heat exchanger module, an inlet duct, a fan assembly, a compressor module, and a turbine module, the fan assembly comprising a plurality of fan blades defining a corresponding fan area ($A_{FAN}$) and wherein the method comprises the steps of:
(i) providing the fan assembly, the compressor module, and the turbine module;
(ii) positioning the heat exchanger module in fluid communication with the fan assembly by the inlet duct;
(iii) providing the heat exchanger module with a plurality of radially-extending vanes arranged in a circumferential array, at least one of the vanes comprising at least one heat transfer element with the or each heat transfer element extending axially along the corresponding vane, a swept heat transfer element area ($A_{HTE}$) being the wetted surface area of the or all heat transfer elements in contact with the airflow, a Fan to Heat Transfer Element Area parameter $F_{EA}$ being defined as:

$$F_{EA} = \frac{A_{HTE}}{A_{FAN}}$$

and the $F_{EA}$ parameter lies in the range of 47 to 132;

(iv) operating the engine such that an airflow passing over a surface of the or each heat transfer element prior to entry of the airflow into an inlet to the fan assembly transfers heat energy from the first fluid contained within the or each heat transfer element to the airflow.

The total wetted area (swept heat transfer element area, $A_{HTE}$) of the heat transfer elements provides a measure of the quantity of heat energy that may be rejected via the heat exchanger module to the through-flowing air flow. The term wetted area is understood to mean the area of the heat transfer elements that is contacted (or swept) by the fluid constituting the air flow as it passes through the heat exchanger module.

Since the flow area of the fan assembly scales with engine thrust (larger fan assembly flow area≡greater engine thrust), the ratio of swept heat transfer element area to fan assembly flow area provides an indicative measure of the efficiency of the turbofan engine at rejecting heat for a given thrust output.

In one arrangement, a turbofan engine has a heat exchanger module having a swept heat transfer element area ($A_{HTE}$) of 70 m² with a fan area ($A_{FAN}$) of 0.53 m². In this configuration the corresponding $F_{EA}$ parameter is approximately 132. Alternatively, the swept heat transfer element area ($A_{HTE}$) may be approximately 25 m² with a fan area ($A_{FAN}$) of 0.53 m² resulting in a $F_{EA}$ parameter of approximately 47.

Optionally, the $F_{EA}$ parameter of step (iii) lies in the range of 57 to 97.

In one arrangement of the present disclosure, the heat transfer element may have a construction in which only a primary surface area of the heat transfer element is swept by the fluid making up the air flow as it passes through the heat exchanger module. One example of a heat transfer element construction having only a primary surface area might be a tube heat exchanger.

In another arrangement, a turbofan engine has a heat exchanger module having a swept heat transfer element area ($A_{HTE}$) of 50 m² with a fan area ($A_{FAN}$) of 0.53 m². In this configuration the corresponding $F_{EA}$ parameter is approximately 94. Alternatively, the swept heat transfer element area ($A_{HTE}$) may be approximately 30 m² with a fan area ($A_{FAN}$) of 0.53 m² resulting in a $F_{EA}$ parameter of approximately 57.

Optionally, the $F_{EA}$ parameter of step (iii) lies in the range of 76 to 123.

In an arrangement of the present disclosure, the heat transfer element may have a construction in which the heat transfer element has both a primary surface area and a secondary surface area, both of which are swept by the fluid making up the air flow as it passes through the heat exchanger module. One example of a heat transfer element construction having both primary and secondary surface areas might be a tube and fin heat exchanger.

In another arrangement, a turbofan engine has a heat exchanger module having a swept heat transfer element area ($A_{HTE}$) of 65 m² with a fan area ($A_{FAN}$) of 0.53 m². In this configuration the corresponding $F_{EA}$ parameter is approximately 123. Alternatively, the swept heat transfer element area ($A_{HTE}$) may be approximately 40 m² with a fan area ($A_{FAN}$) of 0.53 m² resulting in a $F_{EA}$ parameter of approximately 76.

According to another aspect of the present disclosure, there is provided a turbofan gas turbine engine comprising, in axial flow sequence, a heat exchanger module, a fan assembly, a compressor module, and a turbine module, the fan assembly comprising a plurality of fan blades, the heat exchanger module comprising a plurality of heat transfer elements;

wherein the heat exchanger module is in fluid communication with the fan assembly by an inlet duct, the inlet duct extending between a downstream-most face of the heat transfer elements and an upstream-most face of the fan assembly.

A conventional turbofan engine typically uses an engine offtake flow, for example from a compressor stage or from the bypass flow, to provide cooling flow to the heat exchanger. Such conventional arrangements result in a loss of propulsive flow and a consequent reduction in overall engine efficiency.

In contrast, in a turbofan engine according to the present disclosure, the location of the heat exchanger in an inlet duct upstream of the fan assembly means that the engine is able to use all of the intake air to provide propulsive thrust. This means that a turbofan engine according to the present disclosure can be more efficient than a conventional turbofan engine while providing the same level of heat exchanger capacity.

In addition, the engine offtake flow used in a conventional turbofan engine for providing a cooling feed flow to a heat exchanger will have a considerably higher temperature than the intake air flow entering the engine. This in turn limits the temperature at which heat can be rejected to the heat exchanger to temperature that are greater than that of the corresponding engine offtake flow.

The positioning of the heat exchanger upstream of the fan assembly means that the cooling air flow entering the heat exchanger has a temperature that is lower than any engine offtake flow, for example a bleed flow from a compressor stage or the bypass flow. Consequently, in a turbofan engine according to the present disclosure it becomes possible to reject heat to the heat exchanger flow at a lower temperature than can be achieved with any prior art arrangement described above. This makes the turbofan engine according to the present disclosure more versatile than conventional turbofan engines.

Alternatively, a conventional turbofan engine application may employ a heat exchanger separate to the turbofan engine itself but with an airframe intake air nozzle and exhaust air nozzle. In such an arrangement, there will be aerodynamic losses associated with the separate intake and exhaust nozzles.

In contrast, the turbofan engine of the present arrangement allows all heat rejection to be made to the incoming engine intake air stream. This enables any intake and exhaust ducts external to the engine to be eliminated. Any efficiency losses resulting from the presence of the heat exchanger module in the intake flow to the engine will be considerably lower than the losses associated with any intake and exhaust ducts external to the engine. This makes the turbofan engine of the present disclosure more efficient than a conventional turbofan engine while providing the same level of heat exchanger capacity.

The skilled person would appreciate that enabling all heat rejection to be made to the incoming engine intake air stream may allow the elimination of all cooling ducts in the machine body external to the turbofan engine, thus reducing drag produced by the machine body. Further, the skilled person would appreciate that Having an integrated heat exchanger in the turbofan engine may create a more compact engine installation, which may in turn simplify the installation of the turbofan engine on a machine body.

Optionally, the plurality of fan blades defines a fan diameter (D), the inlet duct has a fluid path length extending along a central axis of the inlet duct between the downstream-most face of the heat transfer elements and the upstream-most face of the fan assembly, and the fluid path length is less than 10.0*D.

The fan diameter is understood to be twice the fan tip radius. The fan tip radius may be measured between a centreline of the engine and an outermost tip of each fan blade at its leading edge—this may equivalently be described as the fan tip radius being defined as the radial distance between a centreline of the engine and an outermost tip of each fan blade at its leading edge.

The fluid path is to be understood to mean the route taken by the fluid as it moves through the inlet duct between the heat exchanger module and the fan assembly. The fluid path length is the distance along a central axis of the inlet duct between the point at which the flow leaves the heat transfer elements and the point at which the flow meets the fan assembly. In other words, the fluid path length is the length along the flow path of the fluid as it passes along the inlet duct.

The selection of the fluid path length being less than 10 times the fan diameter has the effect of providing flow stabilisation for the air flow that has passed through the heat exchanger prior to its entry into the fan assembly.

Optionally, the fluid path length is in the range of 1.0*D to 5.0*D.

Limiting the fluid path length to 5 times the fan diameter ensures that a complete turbofan engine according to the present disclosure becomes more easily packaged into an airframe. This makes the turbofan engine according to the present disclosure more convenient and desirable to a user.

Furthermore, limiting the fluid path length to 5 times the fan diameter may also enable the aerodynamic duct losses to be reduced.

According to another aspect of the present disclosure, there is provided a method of operating a turbofan gas turbine engine, the gas turbine engine comprising, in axial flow sequence, a heat exchanger module, a fan assembly, a compressor module, and a turbine module, and the heat exchanger module comprises a plurality of heat transfer elements, and wherein the method comprises the steps of:
  (i) providing the fan assembly, the compressor module, and the turbine module;
  (ii) positioning the heat exchanger module in fluid communication with the fan assembly by an inlet duct; and
  (iii) operating the engine to provide an airflow into the engine to enable the transfer of heat energy from a first fluid contained within the heat transfer elements to an airflow passing over a surface of the heat transfer elements prior to entry of the airflow into the fan assembly.

A conventional turbofan engine typically uses an engine offtake flow, for example from a compressor stage or from the bypass flow, to provide cooling flow to the heat exchanger. Such conventional arrangements result in a loss of propulsive flow and a consequent reduction in overall engine efficiency.

In contrast, in a turbofan engine according to the present disclosure, the location of the heat exchanger in an inlet duct upstream of the fan assembly means that the engine is able to use all of the intake air to provide propulsive thrust. This means that a turbofan engine according to the present disclosure can be more efficient than a conventional turbofan engine while providing the same level of heat exchanger capacity.

In addition, the engine offtake flow used in a conventional turbofan engine for providing a cooling feed flow to a heat exchanger will have a considerably higher temperature than the intake air flow entering the engine. This in turn means that the temperature at which heat can be rejected to the heat exchanger must be greater than the temperature of the corresponding engine offtake flow.

The positioning of the heat exchanger upstream of the fan assembly means that the cooling air flow entering the heat exchanger has a temperature that is lower than any engine offtake flow, for example a bleed flow from a compressor stage or the bypass flow. Consequently, in a turbofan engine according to the present disclosure it becomes possible to reject heat to the heat exchanger flow at a lower temperature than can be achieved with any prior art arrangement described above. This makes the turbofan engine according to the present disclosure more versatile than conventional turbofan engines.

Alternatively, a conventional turbofan engine application may employ a heat exchanger separate to the turbofan engine itself but with an airframe intake air nozzle and exhaust air nozzle. In such an arrangement, there will be aerodynamic losses associated with the separate intake and exhaust nozzles.

In contrast, the turbofan engine of the present arrangement allows all heat rejection to be made to the incoming engine intake air stream. This enables any intake and exhaust ducts external to the engine to be eliminated. Any efficiency losses resulting from the presence of the heat exchanger module in the intake flow to the engine will be considerably lower than the losses associated with any intake and exhaust ducts external to the engine. This makes the turbofan engine of the present disclosure more efficient than a conventional turbofan engine while providing the same level of heat exchanger capacity.

Optionally, the fan assembly comprises a plurality of fan blades defining a fan diameter D, and step (ii) comprises the subsequent step of:
  (ii)(a) arranging the fluid path length of the inlet duct to be less than 10.0*D.

The selection of the fluid path length being less than 10 times the fan diameter has the effect of providing flow stabilisation for the air flow that has passed through the heat exchanger prior to its entry into the fan assembly.

Optionally, the fan assembly comprises a plurality of fan blades defining a fan diameter D, and step (ii) comprises the subsequent step of:
  (ii)(a) arranging the fluid path length of the inlet duct to be in the range of 1.0*D to 5.0*D.

According to another aspect of the present disclosure, there is provided a turbofan gas turbine engine comprising, in axial flow sequence, a heat exchanger module, a fan assembly, a compressor module, and a turbine module, the fan assembly comprising a plurality of fan blades defining a fan diameter D, the heat exchanger module comprising a plurality of heat transfer elements;

wherein the heat exchanger module is in fluid communication with the fan assembly by an inlet duct, the heat exchanger module having an axial length along a central axis of the inlet duct, the axial length of the heat exchanger module being in the range of 0.1*D to 5.0*D.

The axial length of the heat exchanger module limits the space available within the heat exchanger module for heat transfer elements. This in turn dictates the heat rejection capacity of the heat exchanger module; i.e. the quantity of heat energy that can be rejected via the heat exchanger module to an airflow passing through the heat exchanger module.

Since different heat exchanger constructions (i.e. plate and shell, tube and fin, etc.) have a different volumetric space efficiency the selection of the axial length of the heat exchanger module being in the range of 0.1 times to 5.0 times the fan diameter provides a user with the flexibility to select a heat exchanger construction that meets a required heat transfer value.

Optionally, the axial length is in the range of 0.1*D to 3.0*D.

The axial length of the heat exchanger module is dependent upon several factors including inter alia the heat transfer element construction. A user may select a particular heat transfer element construction, which in turn will influence the axial length, in order to achieve, for example, a desired pressure drop in the intake air flow through the heat exchanger module.

Optionally, the axial length is in the range of 0.25*D to 1.0*D.

The selection of the axial length of the heat exchanger module being in the range of 0.25 times to 1.0 times the fan diameter D enables the volume of the heat exchanger module to be reduced. This maximises the volumetric space efficiency of the heat exchanger module and makes the gas turbine engine of the present embodiment easier for a user to package into, for example, an airframe or other machine body.

According to another aspect of the present disclosure, there is provided a method of operating a turbofan gas turbine engine, the gas turbine engine comprising, in axial flow sequence, a heat exchanger module, a fan assembly, a compressor module, and a turbine module, the fan assembly comprising a plurality of fan blades defining a fan diameter D, the heat exchanger module comprising a plurality of heat transfer elements, the method comprising the steps of:
(i) providing the fan assembly, the compressor module, and the turbine module;
(ii) positioning the heat exchanger module in fluid communication with the fan assembly by an inlet duct, the heat exchanger module having an axial length along a central axis of the inlet duct between an upstream-most face of the heat transfer elements and a downstream-most face of the heat transfer elements;
(iii) arranging the axial length of the heat exchanger module to be in the range of 0.1*D to 5.0*D; and
(iv) operating the engine to provide an airflow into the engine to enable the transfer of heat energy from a first fluid contained within the heat transfer elements to an airflow passing over a surface of the heat transfer elements prior to entry of the airflow into an inlet to the fan assembly.

The axial length of the heat exchanger module limits the space available within the heat exchanger module for heat transfer elements. This in turn dictates the heat rejection capacity of the heat exchanger module; i.e. the quantity of heat energy that can be rejected via the heat exchanger module to an airflow passing through the heat exchanger module.

Since different heat exchanger constructions (i.e. plate and shell, tube and fin, etc.) have a different volumetric space efficiency the selection of the axial length of the heat exchanger module being in the range of 0.1 times to 5.0 times the fan diameter D provides a user with the flexibility to select a heat exchanger construction that meets a required heat transfer value.

Optionally, the fan assembly comprises a plurality of fan blades defining a fan diameter D, and step (iii) comprises the step of:
(iii)' arranging the axial length of the heat exchanger module to be in the range of 0.25*D to 1.0*D.

The selection of the axial length of the heat exchanger module being in the range of 0.25 times to 1.0 times the fan diameter enables the volume of the heat exchanger module to be reduced. This maximises the volumetric space efficiency of the heat exchanger module and makes the gas turbine engine of the present embodiment easier for a user to package into, for example, an airframe or other machine body.

According to another aspect of the present disclosure, there is provided a turbofan gas turbine engine comprising, in axial flow sequence, a heat exchanger module, an inlet duct, a fan assembly, a compressor module, and a turbine module, the fan assembly comprising a plurality of fan blades, the heat exchanger module comprising a plurality of heat transfer elements for transfer of heat energy from a first fluid contained within the heat transfer elements to an airflow passing over a surface of the heat transfer elements prior to entry of the airflow into the fan assembly;
wherein, in use, the first fluid has a maximum temperature of 80° C., and the heat exchanger module transfers at least 300 kW of heat energy from the first fluid to the airflow.

In many turbofan gas turbine engine applications, there is be a need to reject heat energy to the surrounding atmosphere. As outlined above, a heat exchanger may be provided that takes a cooling air feed as an offtake from the engine or from the engine's bypass flow. This solution limits the minimum temperature at which heat can be rejected to the heat exchanger to the minimum temperature of the offtake air flow or bypass air flow.

However, by positioning the heat exchanger in the intake air flow to the engine, the turbofan gas turbine engine application according to the present embodiment is able to efficiently reject heat energy at a lower temperature than that of the bypass air flow or any engine offtake air flow. In other words, the turbofan engine of the present disclosure is able to dissipate waste heat energy at a lower temperature than is possible with prior art arrangements. This in turn makes the turbofan engine of the present disclosure more versatile and useful for a user.

The rejection of heat energy to the intake air flow entering the fan assembly of the turbofan engine will result in a temperature increase of the order of 40° C. to 60° C. to that portion of the engine intake air flow that has passed over the heat transfer elements. This heated air will mix with the remainder of the engine intake air flow that has not passed over the heat transfer element, and the resulting blended air flow will form the air intake flow to the fan assembly. While the blended air flow entering the fan assembly will have a higher temperature than the air flow entering the heat exchanger module, any loss in performance due to the increase in intake air temperature to the fan assembly is significantly less than the loss in performance experienced by prior art engine as a result of taking an air offtake stream from, for example, the compressor module.

Consequently, the turbofan engine of the present disclosure is more efficient than prior art equivalents making it more versatile and convenient for a user.

Optionally, the heat exchanger module transfers at least 180 kW of heat energy from the first fluid to the airflow.

In 'multi-engine' applications the heat energy load to be rejected to the incoming inlet air flow can be divided between the turbofan engines in the machine body. Consequently, the heat energy rejection requirement per turbofan engine may be reduced.

Optionally, the airflow enters the heat exchanger module with a maximum air temperature of 48° C.

Limiting the temperature of the air flow entering the heat exchanger module to 48° C. enables the heat exchanger module to efficiently reject heat at a temperature of less than 80° C. to the airflow.

Optionally, the first fluid has a maximum temperature of 150° C.

In another arrangement of the disclosure, the heat exchanger module rejects heat from the first fluid at a temperature of less than 150° C. to the air flow passing through the module. Increasing the maximum temperature of the first fluid results in a larger temperature gradient between the first fluid and the air flow entering the heat exchanger module, which enables the surface area of the heat transfer elements to be reduced. This further reduces the size and weight of the heat exchanger module for a given heat transfer load target.

In this arrangement, heat is rejected at a temperature of 150° C., which is less than that of the bypass air flow or any engine offtake air flow. In other words, the prior art arrangements utilising a bypass air flow, or an engine offtake air flow would not function because their air temperatures are significantly greater than 150° C. This in turn makes the turbofan gas turbine engine of the present disclosure more versatile and useful for a user.

Another feature of the turbofan gas turbine engine of the present disclosure is that even if the temperature of the first fluid was increased to a value greater than the bypass air flow or engine offtake air flow temperatures, the resulting heat exchanger module (positioned upstream of the fan assembly) would always be smaller than any bypass or offtake heat exchanger, because the heat exchanger surface area required is a function of the temperature gradient.

According to another aspect of the present disclosure, there is provided a method of operating a turbofan gas turbine engine, the gas turbine engine comprising, in axial flow sequence, a heat exchanger module, an inlet duct, a fan assembly, a compressor module, and a turbine module, and wherein the method comprises the steps of:
    (i) providing the fan assembly, the compressor module, and the turbine module;
    (ii) providing the heat exchanger module with a plurality of heat transfer elements for transfer of heat energy from a first fluid contained within the heat transfer elements to an airflow passing over a surface of the heat transfer elements prior to entry of the airflow into the fan assembly;
    (iii) positioning the heat exchanger module in fluid communication with the fan assembly by the inlet duct; and
    (iv) operating the engine such that the first fluid has a maximum temperature of 80° C., and the heat exchanger module transfers at least 300 kW of heat energy from the first fluid to the airflow.

In many turbofan gas turbine engine applications, there is be a need to reject heat energy to the surrounding atmosphere. As outlined above, a heat exchanger may be provided that takes a cooling air feed as an offtake from the engine or from the engine's bypass flow. This solution limits the minimum temperature at which heat can be rejected to the heat exchanger to the minimum temperature of the offtake air flow or bypass air flow.

However, by positioning the heat exchanger in the intake air flow to the engine, the turbofan gas turbine engine application according to the present embodiment is able to efficiently reject heat energy at a lower temperature than that of the bypass air flow or any engine offtake air flow. This makes the turbofan engine of the present disclosure more versatile and useful for a user.

The rejection of heat energy to the intake air flow entering the fan assembly of the turbofan engine will result in a temperature increase of the order of 40° C. to 60° C. to that portion of the engine intake air flow that has passed over the heat transfer elements. This heated air will mix with the remainder of the engine intake air flow that has not passed over the heat transfer element, and the resulting blended air flow will form the air intake flow to the fan assembly. While the blended air flow entering the fan assembly will have a higher temperature than the air flow entering the heat exchanger module, any loss in performance due to the increase in intake air temperature to the fan assembly is significantly less than the loss in performance experienced by prior art engine as a result of taking an air offtake stream from, for example, the compressor module.

Consequently, the turbofan engine of the present disclosure is more efficient than prior art equivalents making it more versatile and convenient for a user.

Optionally, step (iv) comprises operation of the engine such that the heat exchanger module transfers at least 180 kW of heat energy from the first fluid to the airflow.

In 'multi-engine' applications the heat energy load to be rejected to the incoming inlet air flow can be divided between the turbofan engines in the machine body. Consequently, the heat energy rejection requirement per turbofan engine may be reduced.

Optionally, step (iv) comprises operation of the engine such that first fluid has a maximum temperature of 150° C.

In another arrangement of the disclosure, the heat exchanger module rejects heat from the first fluid at a temperature of less than 150° C. to the air flow passing through the module. Increasing the maximum temperature of the first fluid results in a larger temperature gradient between the first fluid and the air flow entering the heat exchanger module, which enables the surface area of the heat transfer elements to be reduced. This further reduces the size and weight of the heat exchanger module for a given heat transfer load target In this arrangement heat is rejected at a temperature of 150° C., which is less than that of the bypass air flow or any engine offtake air flow. In other words, the prior art arrangements utilising a bypass air flow or an engine offtake air flow would not function because their air temperatures are significantly greater than 150° C. This in turn makes the turbofan gas turbine engine of the present disclosure more versatile and useful for a user.

Another feature of the turbofan gas turbine engine of the present disclosure is that even if the temperature of the first fluid was increased to a value greater than the bypass air flow or engine offtake air flow temperatures, the resulting heat exchanger module (positioned upstream of the fan assembly) would always be smaller than any bypass or offtake heat exchanger, because the heat exchanger surface area required is a function of the temperature gradient.

According to another aspect of the present disclosure, there is provided a turbofan gas turbine engine comprising, in axial flow sequence, a heat exchanger module, a fan assembly, a compressor module, and a turbine module, the heat exchanger module being in fluid communication with the fan assembly by an inlet duct, the heat exchanger module comprising a plurality of heat transfer elements for transfer of heat energy from a first fluid contained within the heat transfer elements to an airflow passing over a surface of the heat transfer elements prior to entry of the airflow into an inlet to the fan assembly;

wherein, in use, at a full-power condition, the engine produces a maximum thrust T (N), the heat exchanger module transfers a maximum heat rejection H (W) from the first fluid to the airflow;

and a Heat Exchanger Performance parameter $P_{EX}$ (W/N) is defined as:

$$P_{EX} = \frac{H}{T}$$

and the $P_{EX}$ parameter lies in the range of 0.4 to 6.0.

The maximum thrust T (in Newtons, N) produced by the turbofan engine is understood to mean maximum thrust, without exhaust reheat, measured at ISA sea-level standard conditions (i.e. 15° C., 1013 mbar).

A ratio of the maximum thrust produced by the turbofan engine to the maximum quantity of heat energy H (in Watts, W) that can be rejected to an intake air flow of the engine (the $P_{EX}$ parameter) provides a measure of the performance of the heat exchanger module of the turbofan engine.

A higher value of the $P_{EX}$ parameter indicates that the turbofan engine is able to reject a higher quantity of heat energy to a through-flowing air stream for a given level of engine thrust. This in turn makes the turbofan engine more efficient at dissipating heat energy than prior art arrangements and therefore more desirable for a user.

In one arrangement, a turbofan engine produces a maximum dry thrust of 400 kN. In a configuration in which the turbofan engine is required to reject 300 kW of heat energy to the air flow entering the turbofan engine, the corresponding $P_{EX}$ parameter is approximately 0.75. Alternatively, if the turbofan engine is required to reject 180 kW of heat energy to the air flow, the corresponding $P_{EX}$ parameter is approximately 0.45.

In another arrangement, a turbofan engine produces a maximum dry thrust of 52 kN. In a configuration in which the turbofan engine is required to reject 300 kW of heat energy to the air flow entering the turbofan engine, the corresponding $P_{EX}$ parameter is approximately 5.76. In such an arrangement, if the turbofan engine is required to reject 180 kW of heat energy to the air flow, the corresponding $P_{EX}$ parameter is approximately 3.46.

Optionally, the $P_{EX}$ parameter lies in the range of 1.0 to 4.0.

In another arrangement, a turbofan engine produces a maximum dry thrust of 80 kN. In a configuration in which the turbofan engine is required to reject 300 kW of heat energy to the air flow entering the turbofan engine, the corresponding $P_{EX}$ parameter is approximately 3.75. Alternatively, if the turbofan engine is required to reject 180 kW of heat energy to the air flow, the corresponding $P_{EX}$ parameter is approximately 2.25.

According to another aspect of the present disclosure, there is provided a method of operating a turbofan gas turbine engine, the gas turbine engine comprising, in axial flow sequence, a heat exchanger module, an inlet duct, a fan assembly, a compressor module, and a turbine module, and wherein the method comprises the steps of:

(i) providing the fan assembly, the compressor module, and the turbine module;

(ii) providing the heat exchanger module with a plurality of heat transfer elements for transfer of heat energy from a first fluid contained within the heat transfer elements to an airflow passing over a surface of the heat transfer elements prior to entry of the airflow into the fan assembly;

(iii) positioning the heat exchanger module in fluid communication with the fan assembly by the inlet duct; and (iv) operating the engine such that, at a full-power condition, the engine produces a maximum thrust T (N), the heat exchanger module transfers a maximum heat rejection H (W) from the first fluid to the airflow;

and a Heat Exchanger Performance parameter $P_{EX}$ (W/N) is defined as:

$$P_{EX} = \frac{H}{T}$$

and the $P_{EX}$ parameter lies in the range of 0.4 to 6.0

The maximum thrust T (in Newtons, N) produced by the turbofan engine is understood to mean maximum thrust, without exhaust reheat, measured at ISA sea-level standard conditions (i.e. 15° C., 1013 mbar).

A ratio of the maximum thrust produced by the turbofan engine to the maximum quantity of heat energy H (in Watts, W) that can be rejected to an intake air flow of the engine (the $P_{EX}$ parameter) provides a measure of the performance of the heat exchanger module of the turbofan engine.

A higher value of the $P_{EX}$ parameter indicates that the turbofan engine is able to reject a higher quantity of heat energy to a through-flowing air stream for a given level of engine thrust. This in turn makes the turbofan engine more efficient at dissipating heat energy than prior art arrangements and therefore more desirable for a user.

In one arrangement, a turbofan engine produces a maximum dry thrust of 400 kN. In a configuration in which the turbofan engine is required to reject 300 kW of heat energy to the air flow entering the turbofan engine, the corresponding $P_{EX}$ parameter is approximately 0.75. Alternatively, if the turbofan engine is required to reject 180 kW of heat energy to the air flow, the corresponding $P_{EX}$ parameter is approximately 0.45.

In another arrangement, a turbofan engine produces a maximum dry thrust of 52 kN. In a configuration in which the turbofan engine is required to reject 300 kW of heat energy to the air flow entering the turbofan engine, the corresponding $P_{EX}$ parameter is approximately 5.76. In such an arrangement, if the turbofan engine is required to reject 180 kW of heat energy to the air flow, the corresponding $P_{EX}$ parameter is approximately 3.46.

Optionally, the $P_{EX}$ parameter of step (iv) lies in the range of 1.0 to 4.0.

In another arrangement, a turbofan engine produces a maximum dry thrust of 80 kN. In a configuration in which the turbofan engine is required to reject 300 kW of heat energy to the air flow entering the turbofan engine, the corresponding $P_{EX}$ parameter is approximately 3.75. Alternatively, if the turbofan engine is required to reject 180 kW of heat energy to the air flow, the corresponding $P_{EX}$ parameter is approximately 2.25.

The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The turbofan gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any turbofan gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes.

The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31, 0.30, 0.29, or 0.28. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 130 inches). The fan diameter may be in an inclusive range bounded by any two of the values in the previous sentence (i.e. the values may form upper or lower bounds), for example in the range of from 50 cm to 70 cm or 90 cm to 130 cm.

The fan face area may be equal to $\pi$ multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 10000 rpm, for example in the range of from 7500 rpm to 10000 rpm, for example in the range of from 8000 rpm to 9000 rpm. Purely by way of further non-limitative example, the rotational speed of the fan at cruise conditions for an engine having a fan diameter in the range of from 90 cm to 150 cm may be in the range of from 7000 rpm to 9000 rpm, for example in the range of from 7500 rpm to 8600 rpm, for example in the range of from 8000 rpm to 8600 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, or 1.5. The bypass ratio may be in an inclusive range bounded by any two of the values in the previous sentence (i.e. the values may form upper or lower bounds), for example in the range of form of 0.4 to 1.0, 0.5 to 0.9, or 0.6 to 0.9. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e. the values may form upper or lower bounds), for example in the range of from 20 to 35.

Specific thrust of a turbofan gas turbine engine may be defined as the net thrust of the engine divided by the total mass flow through the engine. At cruise conditions, the specific thrust of an engine described and/or claimed herein may be less than (or on the order of) any of the following: 300 $Nkg^{-1}s$, 350 $Nkg^{-1}s$, 400 $Nkg^{-1}s$, 450 $Nkg^{-1}s$, 500 $Nkg^{-1}s$, 550 $Nkg^{-1}s$, 600 $Nkg^{-1}s$, 650 $Nkg^{-1}s$ or 700 $Nkg^{-1}s$. The specific thrust may be in an inclusive range bounded by any two of the values in the previous sentence (i.e. the values may form upper or lower bounds), for example in the range of from 300 $Nkg^{-1}s$ to 450 $Nkg^{-1}s$, or 450 $Nkg^{-1}s$ to 600 $Nkg^{-1}s$. Such engines may be particularly efficient in comparison with conventional gas turbine engines.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K or 2300K. The maximum TET may be in an inclusive range bounded by any two of the values in the previous sentence (i.e. the values may form upper or lower bounds), for example in the range of from 1800K to 2200K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a turbofan gas turbine engine as described and/or claimed herein may have any desired number of fan blades, for example 12, 14, 16, 18, 20, 22, 24 or 26 fan blades.

As used herein, cruise conditions have the conventional meaning and would be readily understood by the skilled person. Thus, for a given turbofan gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given turbofan gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.5 to 0.9, for example 0.55 to 0.65, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 40 kN to 65 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 70 kN to 95 kN) at a forward Mach number of 0.85 and standard atmospheric conditions (according to the International Standard Atmosphere) at an altitude of 35000 ft (10668 m).

In use, a turbofan gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the disclosure, there is provided a method of operating a turbofan gas turbine engine as described and/or claimed herein. The operation may be at the cruise conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
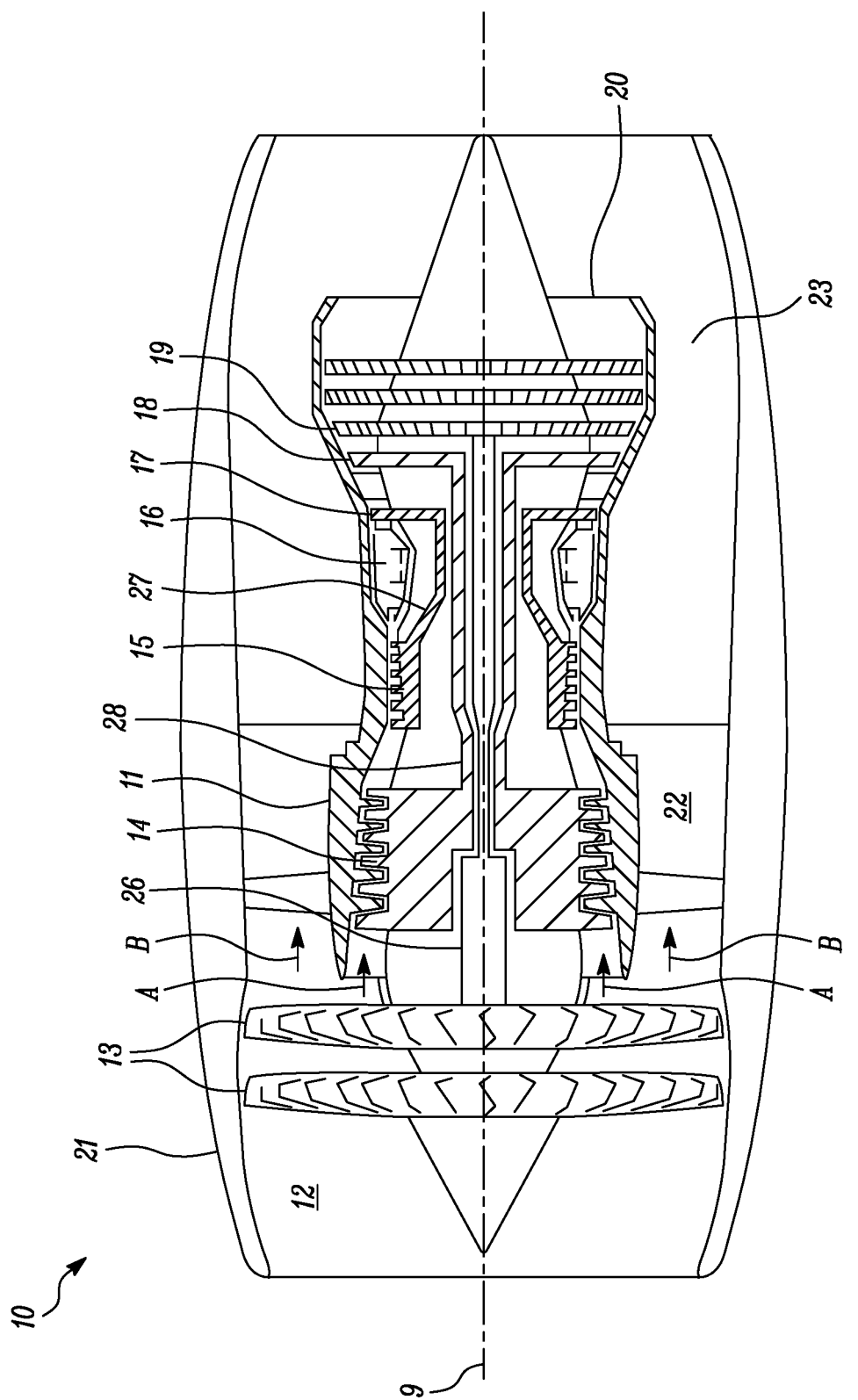
FIG. 1 shows a schematic part-sectional view of a turbofan gas turbine engine according to the prior art.

FIG. 1 illustrates a conventional turbofan gas turbine engine 10 having a principal rotational axis 9. The engine 10 comprises an air intake 12 and a two-stage propulsive fan 13 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, an intermediate-pressure turbine 18, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 13 is attached to and driven by the low-pressure turbine 19 via a shaft 26.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure, intermediate-pressure, and low-pressure turbines 17, 18, 19 before being exhausted through the nozzle 20 to provide some propulsive thrust. The high-pressure turbine 17 drives the high-pressure compressor 15 by a suitable interconnecting shaft 27. The low-pressure compressor 14 drives the intermediate-pressure turbine 18 via a shaft 28.

Note that the terms "low-pressure turbine" and "low-pressure compressor" as used herein may be taken to mean the lowest pressure turbine stages and lowest pressure compressor stages (i.e. not including the fan 13) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 13 may be referred to as a first, or lowest pressure, compression stage.

Other turbofan gas turbine engines to which the present disclosure may be applied may have alternative configurations. For example, such engines may have an alternative number of fans and/or compressors and/or turbines and/or an alternative number of interconnecting shafts. By way of further example, the gas turbine engine shown in FIG. 1 has a split flow nozzle 20, 23 meaning that the flow through the bypass duct 22 has its own nozzle 23 that is separate to and radially outside the core engine nozzle 20. However, this is not limiting, and any aspect of the present disclosure may also apply to engines in which the flow through the bypass duct 22 and the flow through the core engine 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the turbofan gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
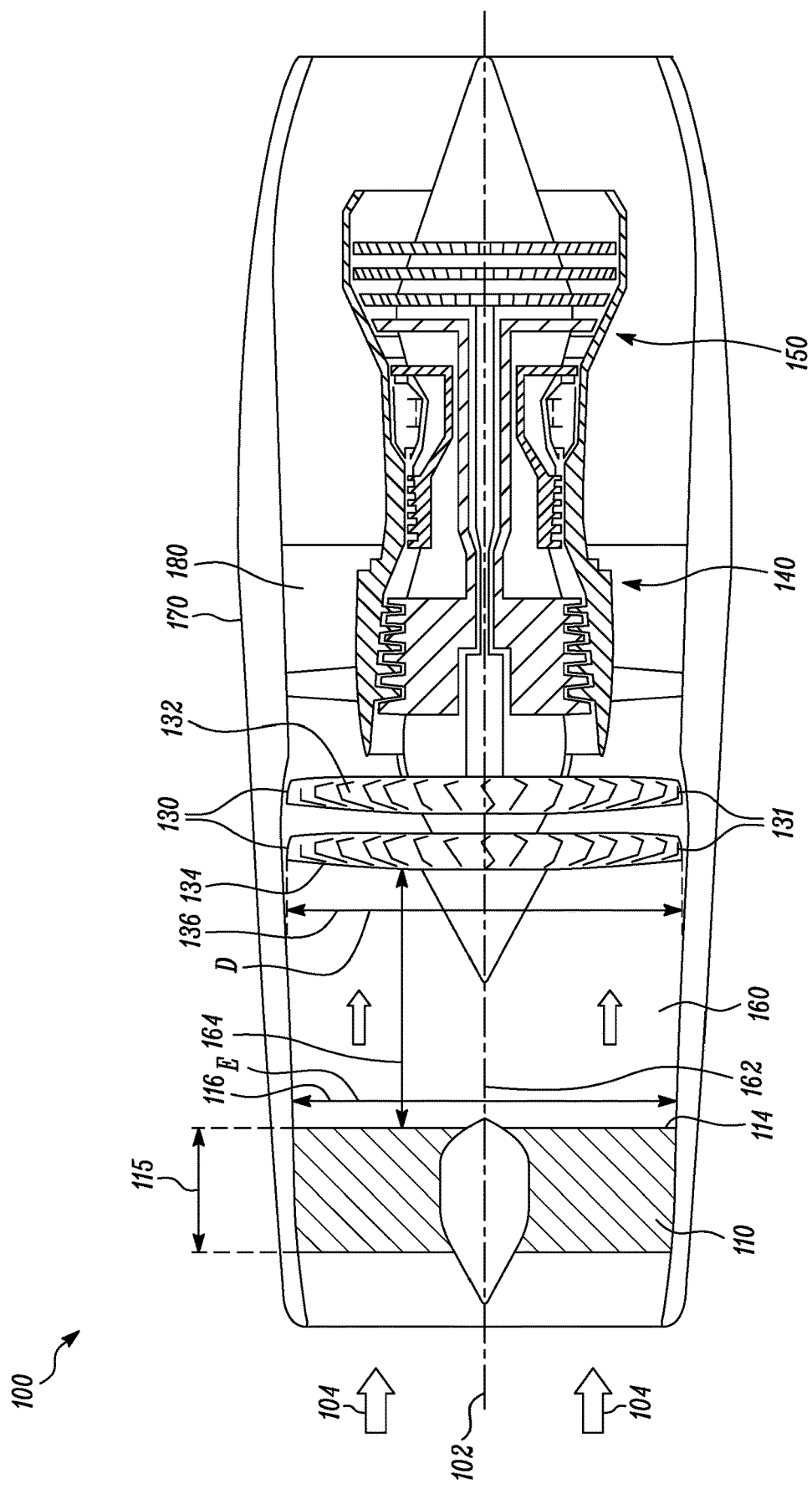
FIG. 2 shows a schematic part-sectional view of a turbofan gas turbine engine according to a first embodiment of the disclosure.

Referring to FIG. 2, a turbofan gas turbine engine according to a first embodiment of the disclosure is designated generally by the reference numeral 100. The turbofan gas turbine engine 100 comprises in axial flow sequence, a heat exchanger module 110, a fan assembly 130, a compressor module 140, and a turbine module 150.

In the present arrangement, the fan assembly 130 comprises two fan stages 131, with each fan stage 131 comprising a plurality of fan blades 132. In the present arrangement each fan stage 131 has the same fan diameter 136, with the respective plurality of fan blades defining a fan diameter of 0.9 m. In an alternative arrangement, the two fan stages 131 may have different fan diameters 136 each defined by the corresponding plurality of fan blades 132. As previously mentioned, the fan diameter (D) 136 is defined by a circle circumscribed by the leading edges of the respective plurality of fan blades 132.

The heat exchanger module 110 comprises a plurality of heat transfer elements 112. The heat exchanger module 110 is in fluid communication with the fan assembly 130 by an inlet duct 160. The heat exchange module 110 has an axial length 115 of 0.4 m, this being 0.4 times the fan diameter of 0.9 m.

The inlet duct 160 extends between a downstream-most face of the heat transfer elements and an upstream-most face of the fan assembly. In the present arrangement, the inlet duct 160 is linear. However, in other arrangements the inlet duct 160 may be curved or convoluted.

The inlet duct 160 has a fluid path length 164 of 3.6 m, this being 4.0 times the fan diameter of 0.9 m. The fluid path length 164 extends along a central axis 162 of the inlet duct 160.

As outlined earlier, the heat exchanger module 110 has a flow area ($A_{HEX}$) 118. The heat exchanger module flow area 118 is the cross-sectional area of the heat exchanger module 110 through which an air flow 104 passes before being ingested by the fan assembly 130. In the present arrangement, the heat exchanger module flow area 118 has an annular cross-section and corresponds directly to the shape of the air flow passing through the heat exchanger module 110.

The fan assembly 130 has a corresponding flow area ($A_{FAN}$) 138. The fan assembly flow area 138 is the cross-sectional area of the fan assembly 130 through which an air flow 104 passes before separating into a core engine flow and a bypass flow. The fan assembly flow area 138 has an annular shape since it corresponds to the annular area swept by the fan blades 132.

In the present arrangement, the heat exchanger module flow area 118 is equal to the fan assembly flow area 138, and the corresponding ratio of $A_{HEX}/A_{FAN}$ is equal to 1.0.

The heat exchanger module 110 has a flow diameter (E) 116, which is the diameter of the air flow passing through the heat exchanger module 110. In the present arrangement, the heat exchanger module flow diameter 116 is equal to the fan diameter 136.

The heat exchanger module 110 comprises a plurality of heat transfer elements 112 for the transfer of heat energy from a first fluid 190 contained within the heat transfer elements 112 to an airflow 104 passing over a surface 113 of the heat transfer elements 112 prior to entry of the airflow 104 into the fan assembly 130. In the present embodiment, the first fluid 190 is a mineral oil. In other arrangements, the first fluid 190 may be an alternative heat transfer fluid such as, for example, a water-based fluid, or the fuel used by the turbofan gas turbine engine.

The heat transfer elements 112 have a conventional tube and fin construction and will not be described further. In an alternative arrangement, the heat transfer elements may have a different construction such as, for example, plate and shell.

The turbofan gas turbine engine 100 further comprises an outer housing 170. The outer housing 170 fully encloses the sequential arrangement of the heat exchanger module 110, inlet duct 160, fan assembly 130, compressor module 140, and turbine module 150. The outer housing 170 defines a bypass duct 180 between the outer housing 170 and the core engine components (comprising inter alia the compressor module 140 and the turbine module 150). In the present arrangement, the bypass duct 180 has a generally axi-symmetrical annular cross-section extending over the core engine components. In other arrangements, the bypass duct 180 may have a non-symmetric annular cross-section or may not extend around a complete circumference of the core engine components.

Figure 4:
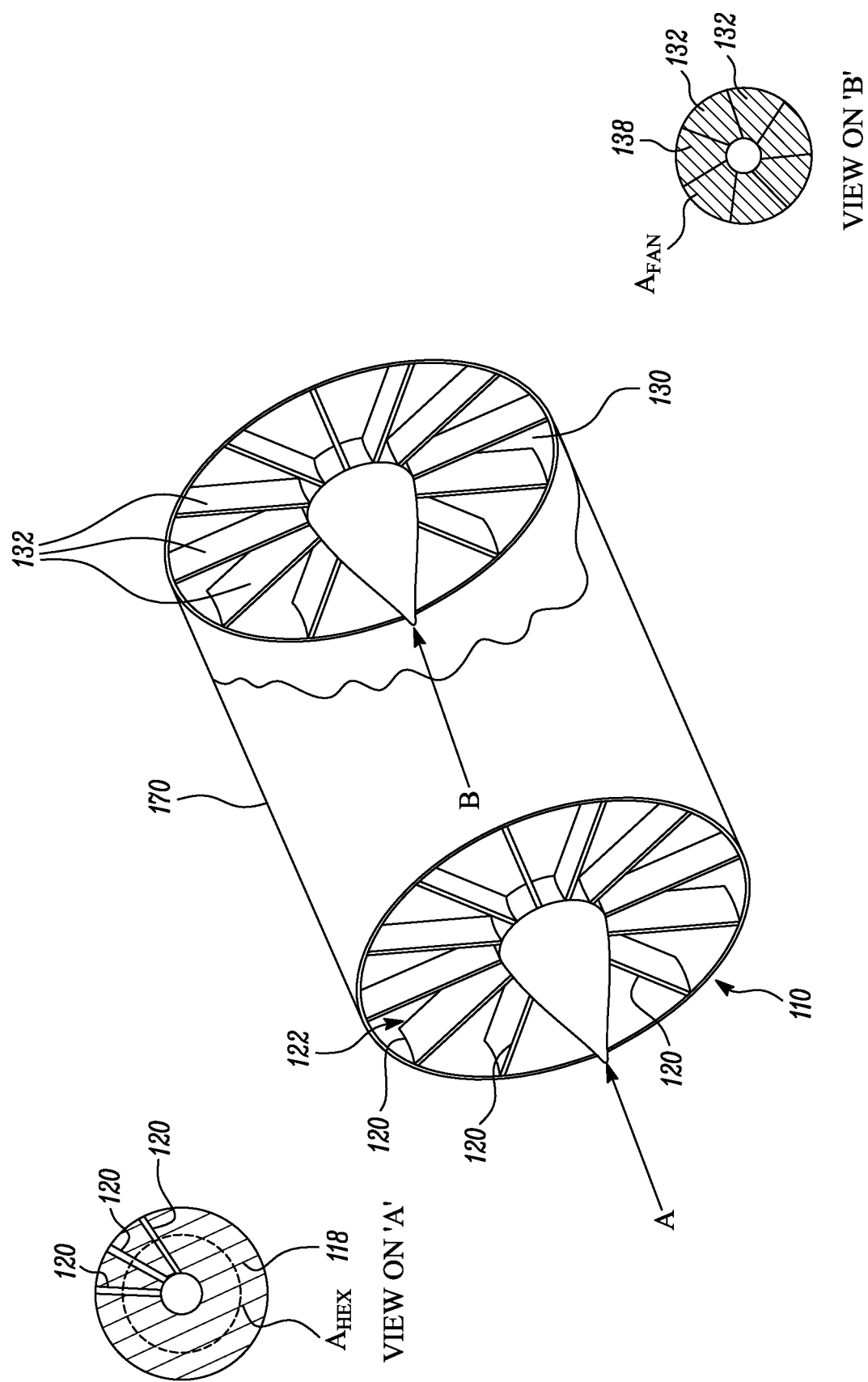
FIG. 4 shows a perspective schematic view of the heat exchanger module of the turbofan engine of FIG. 2 showing the circumferential array of vanes forming the heat exchanger module.
Figure 5:
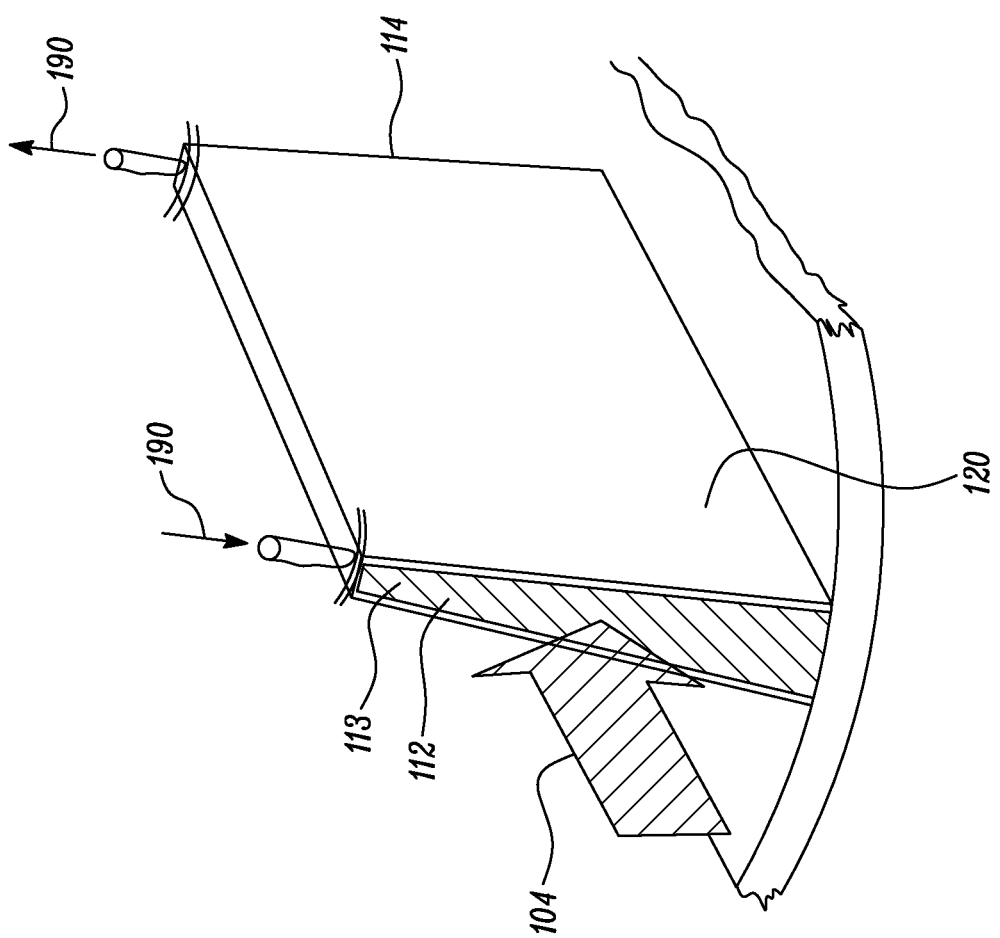
FIG. 5 shows a perspective schematic part-sectional view of one of the vanes of the heat exchanger module of FIG. 4.

FIG. 4 shows a perspective view of the heat exchanger module 110 and fan assembly 130 of the turbofan gas turbine engine 100 according to the first embodiment. The heat exchanger module 110 comprises sixteen radially extending vanes 120 arranged in a circumferential array 122. Alternative embodiments may have more or fewer radially extending vanes 120. In the present arrangement, each of the vanes 120 is hollow and each vane comprises a single heat transfer element 112 positioned within the vane 120. The alternative embodiments may not have a heat transfer element 112 within each vane 120 or may have more than one heat transfer element 112 in any single vane 120.

Each of the heat transfer elements 112 has a corresponding swept area, which is the area of the heat transfer element 112 that is contacted by the air flow 104. In the present arrangement, the total swept heat transfer element area ($A_{HTE}$) is the sum of the swept area of each of the individual heat transfer elements 112.

Each vane 120 is configured to allow the air flow 104 passing through the heat exchange module to pass through the hollow portion of the vane 120 and thence to flow over the respective heat transfer element 112. In this way heat energy is transferred from the first fluid 190 to the air flow 104.

Fan to Heat Transfer Element Area Parameter

A Fan to Heat Transfer Element Area parameter $F_{EA}$ is defined as a ratio of the total swept heat transfer element area ($A_{HTE}$—defined in the preceding paragraph) to the fan assembly flow area ($A_{FAN}$—defined earlier). For the present arrangement, the swept heat transfer element area is approximately 52 m², while the fan assembly flow area is approximately 0.43 m². This makes the Fan to Heat Transfer Element Area parameter approximately 121.

Heat Energy Rejection Performance

In use, the first fluid 190 enters the heat transfer elements 112 having a maximum temperature of 80° C. The heat transfer module 110, comprising all of the heat transfer elements 112, transfers approximately 325 kW of heat energy from the first fluid 190 passing through the heat transfer elements 112 to the air flow 104 passing through the heat exchanger module 110.

In the present application, the first fluid 190 draws heat energy from, for example, mechanical systems such as, for example, the engine lubrication system, and electrical systems both on the turbofan engine and external to the turbofan engine. In other arrangements, the first fluid 190 may draw heat energy only from the turbofan engine, or alternatively only from systems external to the turbofan engine.

Heat Exchanger Performance Parameter

In use, the turbofan gas turbine engine 100 according to the first embodiment has a maximum dry thrust of 190 kN at a full-power engine condition. The term 'dry thrust' is understood to mean the engine's thrust performance without any supplementary thrust such as from an exhaust reheat system or similar. The engine's thrust performance is measured at standard sea-level static (SLS) atmospheric conditions (i.e. 15° C., 1013 mbar).

With the turbofan engine 100 operating at a full-power condition referred to above, the fan assembly 130 will have a maximum rotational speed of approximately 9500 rpm.

As outlined above, the heat exchanger module 110 transfers approximately 325 kW of heat energy from the first fluid 190 to the airflow 104 passing through the heat exchanger module 110.

Consequently, a Heat Exchanger Performance parameter $P_{EX}$ is defined as a ratio of the heat energy rejection to the maximum dry thrust. For the turbofan gas turbine engine of the present arrangement, the ratio $P_{EX}$ is 1.7.

Figure 3:
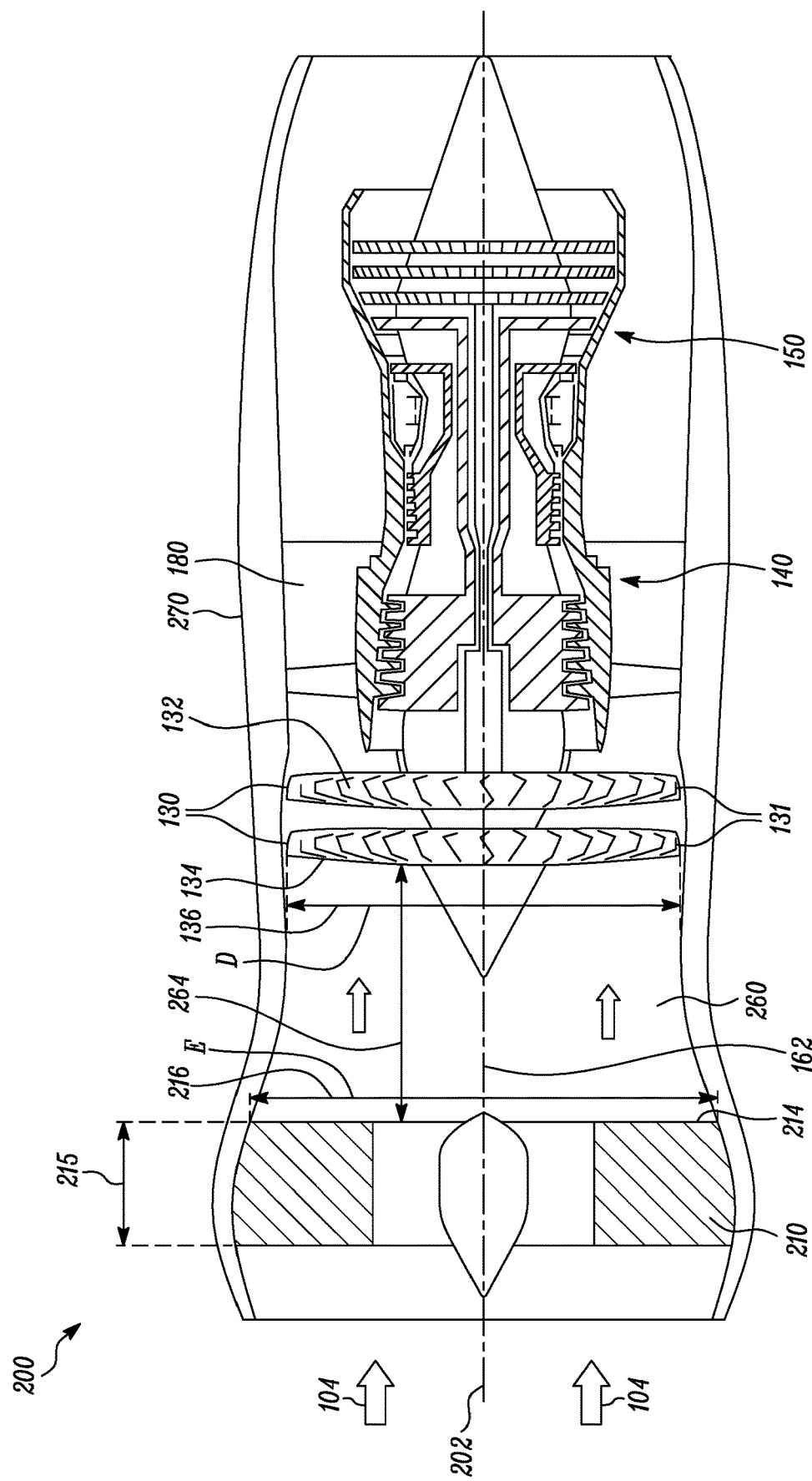
FIG. 3 shows a schematic part-sectional view of a turbofan gas turbine engine according to a second embodiment of the disclosure.

Referring to FIG. 3, a turbofan gas turbine engine according to a second embodiment of the disclosure is designated generally by the reference numeral 200. Features of the turbofan gas turbine engine 200 which correspond to those of turbofan gas turbine engine 100 have been given corresponding reference numerals for ease of reference.

The turbofan gas turbine engine 200 comprises in axial flow sequence, a heat exchanger module 210, a fan assembly 130, a compressor module 140, and a turbine module 150. The fan assembly 130, compressor module 140, and turbine module 150 correspond directly to the those of the first embodiment described above.

The heat exchanger module 210 comprises a plurality of heat transfer elements 212 and is also in fluid communication with the fan assembly 130 by an inlet duct 260. As in the first embodiment, the inlet duct 260 extends between a downstream-most face of the heat transfer elements and an upstream-most face of the fan assembly.

The inlet duct 260 has a fluid path length 264 along a central axis 162 of the inlet duct 260 of 2.4 m, this being 2.7 times the fan diameter of 0.9 m.

The heat exchanger module 210 has a flow area ($A_{HEX}$) 218. As in the first embodiment, the heat exchanger module flow area 118 is annular in cross-section. However, in this arrangement the heat transfer elements 212 do not extend completely across that cross-section of the heat exchange module 210 that is available for the flow 104. In other words, there is a radially proximal portion of the cross-section of the heat transfer module across which there are no heat transfer elements 212.

The fan assembly 130 has a flow area ($A_{FAN}$) 138 that, as described above, has an annular shape corresponding to the annular area swept by the fan blades 132.

In the present arrangement, despite the heat exchanger module flow area 218 having different dimensions to the fan assembly flow area 138, the heat exchanger module flow area 218 is equal to the fan assembly flow area 138. As for the first embodiment, the corresponding ratio of $A_{HEX}/A_{FAN}$ is equal to 1.0.

The heat exchanger module 210 has a flow diameter 216. The heat exchanger module flow diameter 216 is greater than the fan diameter 136.

The turbofan gas turbine engine 200 further comprises an outer housing 270. As with the first embodiment described above, the outer housing 170 fully encloses the sequential arrangement of the heat exchanger module 210, inlet duct 260, fan assembly 130, compressor module 140, and turbine module 150. The outer housing 270 also defines an annular bypass duct 180 between the outer housing 170 and the core engine components In use the turbofan gas turbine engine 200 functions in the same manner as described above in relation to the turbofan gas turbine engine 100 of the first embodiment.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

What is claimed is:

1. A turbofan gas turbine engine comprising, in axial flow sequence:
    a heat exchanger module comprising a plurality of radially-extending hollow vanes arranged in a circumferential array, at least one of the vanes comprising a heat transfer element positioned within the vane and that extends axially along the vane and is for transfer of heat from a first fluid contained within the heat transfer element to an airflow passing through a hollow portion of the vane and over a surface of the heat transfer element prior to entry of the airflow into an inlet to a fan assembly;
    the fan assembly, which (i) is in fluid communication with the heat exchanger module by way of an inlet duct and (ii) comprises a plurality of fan blades defining a corresponding fan area ($A_{FAN}$);
    a compressor module; and
    a turbine module,
    wherein a swept heat transfer element area ($A_{HTE}$) is a wetted surface area of all of the heat transfer elements in contact with the airflow,
    a Fan to Element Area $F_{EA}$ parameter is defined as:

$$F_{EA} = \frac{A_{HTE}}{A_{FAN}}$$

and the $F_{EA}$ parameter lies in a range of 47 to 132.

2. The turbofan gas turbine engine as claimed in claim 1, wherein the $F_{EA}$ parameter lies in a range of 57 to 97.

3. The turbofan gas turbine engine as claimed in claim 1, wherein the $F_{EA}$ parameter lies in a range of 76 to 123.

4. The turbofan gas turbine engine as claimed in claim 1, wherein the fan assembly comprises a plurality of fan blades defining a fan diameter D, and the fan diameter D is within a range of 0.3 m to 2.0 m.

5. The turbofan gas turbine engine as claimed in claim 1, wherein the heat exchanger module has a flow area $A_{HEX}$, the fan assembly has a flow area $A_{FAN}$, and a ratio of $A_{FAN}$ to $A_{HEX}$ is in a range of 0.3 to 0.8.

6. The turbofan gas turbine engine as claimed in claim 1, wherein the heat exchanger module has a fluid path diameter E, and the fluid path diameter E is greater than a fan diameter D.

7. The turbofan gas turbine engine as claimed in claim 1, further comprising an outer housing enclosing the heat exchanger module, the fan assembly, the compressor module, and the turbine module,
    wherein an annular bypass duct is defined between the outer housing and an engine core comprising the compressor and turbine modules,
    a bypass ratio is defined as a ratio of a mass air flow rate through the bypass duct to a mass air flow rate through the engine core at cruise conditions, and
    the bypass ratio is less than 2.0.

8. The turbofan gas turbine engine as claimed in claim 1, wherein the fan assembly has two or more fan stages, at least one of the fan stages comprising a plurality of fan blades defining a fan diameter D.

9. The turbofan gas turbine engine as claimed in claim 1, wherein the at least one vane comprises a plurality of the heat transfer elements.

10. A method of operating an aircraft comprising the turbofan gas turbine engine as claimed in claim 1, the method comprising taking off from a runway, wherein a maximum rotational speed of the turbine during take-off is in a range of from 8500 rpm to 12500 rpm.

11. A method of operating a turbofan gas turbine engine, the turbofan gas turbine engine comprising, in axial flow sequence, (i) a heat exchanger module, (ii) an inlet duct, (iii) a fan assembly comprising a plurality of fan blades defining a corresponding fan area ($A_{FAN}$), (iv) a compressor module, and (v) a turbine module, and the method comprising the steps of:
    (i) providing the fan assembly, the compressor module, and the turbine module;
    (ii) positioning the heat exchanger module in fluid communication with the fan assembly by way of the inlet duct;
    (iii) providing the heat exchanger module with a plurality of radially-extending hollow vanes arranged in a circumferential array, at least one of the vanes comprising a heat transfer element positioned within the vane and extending axially along the vane,
    a swept heat transfer element area ($A_{HTE}$) being a wetted surface area of all the heat transfer elements in contact with an airflow passing over a surface of each heat transfer element prior to entry of the airflow into an inlet to the fan assembly,
    a Fan to Element Area $F_{EA}$ parameter being defined as:

$$F_{EA} = \frac{A_{HTE}}{A_{FAN}}$$

and the $F_{EA}$ parameter lying in a range of 47 to 132; and (iv) operating the engine such that the airflow passes through a hollow portion of the vane and transfers heat energy from a first fluid contained within each heat transfer element to the airflow.

12. The method of claim 11, wherein the $F_{EA}$ parameter of step (iii) lies in a range of 57 to 97.

13. The method of claim 11, wherein the $F_{EA}$ parameter of step (iii) lies in a range of 76 to 123.

14. The method of claim 11, wherein the at least one vane comprises a plurality of the heat transfer elements.

* * * * *